Jan. 19, 1971    K. VON ZEPPELIN ET AL    3,555,811
BATTERY-POWERED WRIST WATCH
Filed Dec. 27, 1968    2 Sheets-Sheet 1
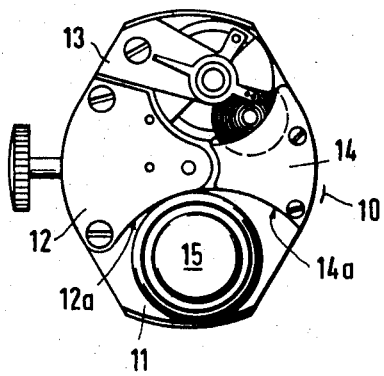
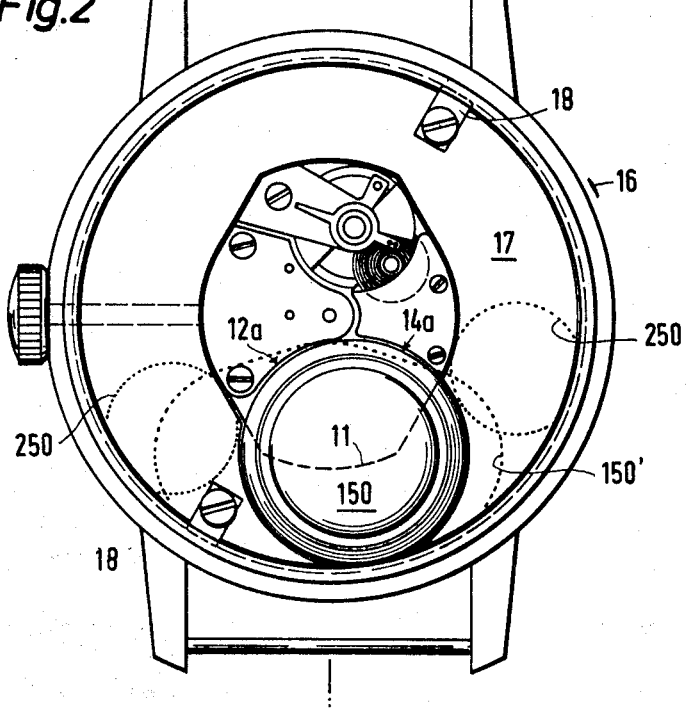
INVENTORS
Kurt von Zeppelin
Günther Scholz
BY
Watson, Cole, Grindle & Watson
Attys.

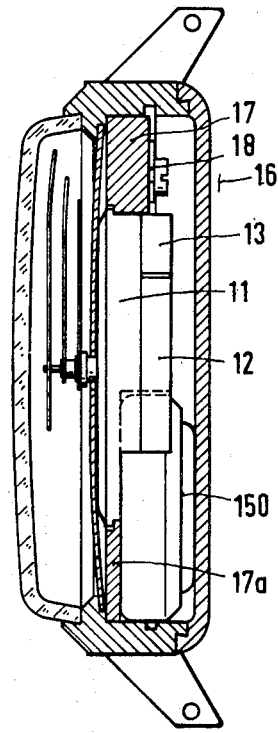
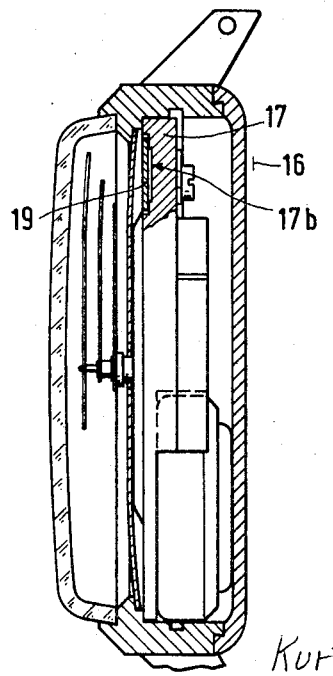

United States Patent Office 3,555,811
Patented Jan. 19, 1971

3,555,811
BATTERY-POWERED WRIST WATCH
Kurt von Zeppelin and Günther Scholz, Schramberg, Wurttemberg, Germany, assignors to Messrs. Gebruder Junghans G.m.b.H., Schramberg, Wurttemberg, Germany, a corporation of Germany
Filed Dec. 27, 1968, Ser. No. 787,501
Claims priority, application Germany, Dec. 29, 1967, 1,673,761
Int. Cl. G04c 3/00; G04b 19/24, 37/00
U.S. Cl. 58—23
1 Claim

ABSTRACT OF THE DISCLOSURE

Battery powered wrist watch having a case with a clockwork movement mounted therein and an open space between the periphery of the movement and the sides of the case for a battery cell. A collar surrounds the movement which securely holds the latter in the case.

---

The invention relates to a battery-powered wrist watch. In known watches of this type, the drive of which is controlled electronically or by mechanical contacts, the caliber, or size or gage of the case corresponds exactly to that of the clockwork-movement, a 11½′′′ caliber movement for a men's wrist watch being set in a 11½′′′ caliber case, for example. The space for the cell or battery is consequently a recess located always within the periphery of the movement, and the cell capacity therefore lies at the lower limit of the desired amount, it usually being sufficient for one year of operation.

Since electro-mechanical movements even today must be periodically inspected, and cleaned and oiled about every three years or more often, the purpose of the invention is to produce a battery-powered wrist watch which appreciably increases the battery capacity without detracting from the outer appearance of the case or the wrist watch by a structure added to the one or the other side. The invention, in particular, prolongs the period between fresh batteries to about three years, the normal length of time between successive servicing.

In accordance with the invention, the movement is undersize with respect to its case, whereby a part of the open space between the case and the periphery of the movement combines with the battery space incorporated by the movement to provide an enlarged area for one or more cells. If, for example, a caliber 6½′′′ by 8′′′ ladies' movement is mounted in a men's case for a 11½′′′ caliber movement, the diameter gained for a button-cell battery is so great that the battery volume can be trippled. In this invention, the undersized movement takes on the function of an integral part which can be mounted in an oversized case in any desired and suitable way.

In a refinement of the invention, the battery space in the movement is shaped to correspond to the peripheral shape of the one or more cells contained in the entire battery space. The cell (or the several cells together) constitutes a store of energy appreciably greater than that normally provided for the movement.

The movement incorporates space for an oversized battery or cell, or for several cells, whether the movement is to be mounted in a case of the same, or of a larger, size. If it is mounted in a case of the same size, so that the cell or battery must be located entirely within the periphery of the bottom plate, there can be provided spacers shaped to fit the periphery of the battery or cell, such as a button cell.

In accordance with the invention, a disc-shaped cell can be replaced by one of another shape, such as an oval, in order to concentrate the greatest possible amount of battery capacity within the space available. In another modification of the invention, several disc-shaped cells of the same diameter, or of different diameters, can be used.

Further objects of the invention will be apparent from the following description when considered in connection with the accompanying drawings in which;

FIG. 1 is a rear elevation of a battery-powered 6¾′′′ by 8 ′′′ caliber ladies' movement, FIG. 2 is a rear view of the movement shown in FIG. 1 mounted in a men's wrist-watch case intended for a 11½′′′ caliber movement, FIG. 3 is a cross-section taken along line III–III of FIG. 2 in the direction of the arrows, and FIG. 4 is a cross-section corresponding to that in FIG. 3 of a wrist watch incorporating a day star-wheel.

With reference to the drawing, the reference numeral 10 indicates the clockwork-movement as a whole, the movement having a caliber 6¾′′′ by 8′′′ and essentially comprising a bottom plate 11, the gear-train bridge 12, the balance mount 13, the electronic unit 14, and the button cell 15. The movement 10 in the embodiment shown in FIG. 1 is intended to be set in a ladies' wrist watch case of the same caliber as the movement.

FIG. 2 shows the movement set in a men's wrist watch case 16, which is intended for a 11½′′′ caliber movement. The movement 10 is securely held in the case by a collar 17 and small holding plates 18. The button cell 15 is replaced by a button cell 150, which is oversized for the movement 10, and has a volume approximately three times that of the cell 15. The movement collar 17 incorporates a recess 17a for the cell 150. The gear-train bridge 12 and the electronic unit 14 embody from the start (see FIG. 1), respective circularly arcuate seats 12a and 14a for mounting an oversized cell 150 and for delimiting the cell mounting space. This cell need not necessarily be disc-shaped; it can also be oval-shaped. Or several smaller cells 250 can be set next to a large cell 150, in which case the collar 17 is provided with suitable seats for the cells 250.

In a modification of the watch, shown in FIG. 4, the movement collar 17 embodies a recess 17b for the day star-wheel 19 of a known calendar mechanism. An intermediate lever, or an equivalent part, is advantageously arranged on the collar 17 to transmit the operating movement from the hour wheel to the day star.

Although the preferred embodiments of the invention have been described, the scope of, and the breadth of protection afforded to, the invention are limited solely by the appended claim.

We claim:
1. Battery powered wrist watch, comprising a case, a clockwork movement mounted in said case and under- sized with respect thereto to provide an open space between the periphery of said movement and the sides of said case, and said movement having a battery cell space which with a part of said open space together forming an enlarged space for at least one cell for powering the watch to thus provide a greater amount of electrical energy stored, a collar surrounding said movement for securely holding the latter in said case, and a calendar mechanism on the collar and including a day star wheel incorporated by said collar.

References Cited

UNITED STATES PATENTS 3,468,389    9/1969    Nakai et al. _____ 58—23

RICHARD B. WILKINSON, Primary Examiner

E. C. SIMMONS, Assistant Examiner

U.S. Cl. X.R.

58—4, 53, 58